April 23, 1957 R. E. MILLSAP 2,789,343
BEARING PULLER
Original Filed Nov. 1, 1952

INVENTOR.
BY Robert E. Millsap
A. Hiram Sturges

ATTORNEY.

United States Patent Office 2,789,343
Patented Apr. 23, 1957

2,789,343

BEARING PULLER

Robert E. Millsap, Omaha, Nebr.

Application March 22, 1956, Serial No. 573,231

4 Claims. (Cl. 29—259)

This invention relates to bearing pullers and more particularly it is an object to provide a bearing puller of improved construction.

Bearing pullers of the prior art have been constructed in a manner permitting the pulling bolt to directly engage the end of the shaft. The ends of such pulling bolts are pointed as a rule but nevertheless the constant turning of the end of the pulling bolt in the centering hole in the end of a shaft damages the shaft severely, making it impossible to turn the shaft later in a lathe without first re-centering the shaft.

The prior art bearing pullers have had a back crossbar but have lacked a front crossbar, not having anything to gain in having a front crossbar because of using the bolt itself to engage the shaft.

So one object of the invention is to employ a front crossbar secured to an engaging head to eliminate prior art disadvantages, the pulling bolt rotating in the head rather than in the shaft.

A particular object is to have the pulling bolt rotate with respect to a point shaft engaging member, rather than rotating with respect to the shaft itself.

Still another object is to provide holes through the forward crossbar for receiving pins to hold the clamping arms onto a bearing or wheel to be pulled, as well as gears, couplings and the like.

Yet another new object is an extension which is used when bearings are close to the end of the shaft.

Still another object is to provide a bearing ball in the head member to receive the rotary thrust of the pulling bolt.

Yet another object of the invention is to provide a device for the purpose described which is sturdy and durable in construction, reliable and efficient in operation, and relatively simple and inexpensive to manufacture, assemble and utilize.

This application is a continuation of the applicant's co-pending patent application No. 318,181, filed November 1, 1952, now abandoned.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims In the drawings:

Figure 1:
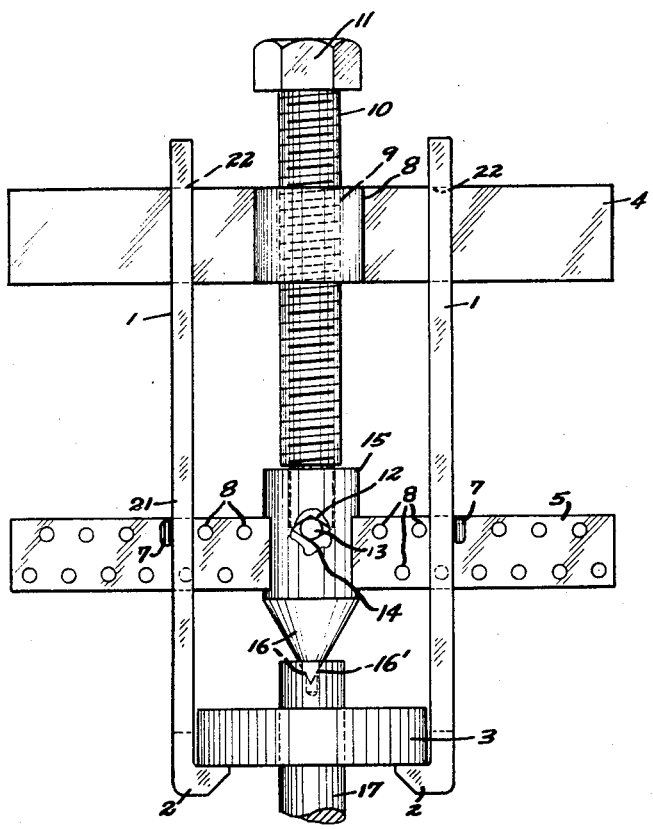
Figure 1 is a top plan view of the device, showing it exerting a force against the center of a shaft and exerting an outward pull against the backside of a bearing or gear.
Figure 2:
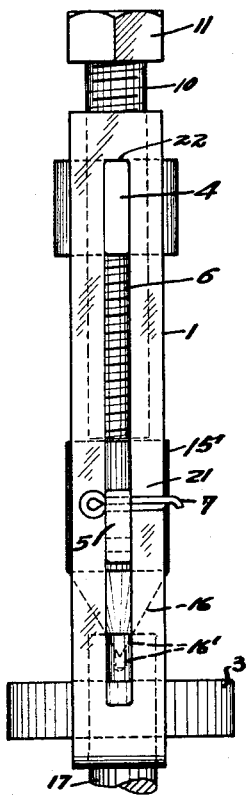
Figure 2 is an end elevation showing the device as it would be seen from the right hand side in Figure 1.

Referring in detail to the drawings, the numeral 1 indicates parallel slotted pulling bars, terminating in inturned portions 2 for forming hooks to engage a bearing 3.

The rearward horizontal crossbar 4 and the forward horizontal crossbar 5 pass through slots 6 in the pulling bars 1 so that the pulling bars may move in a horizontal plane. A cotter pin 7 is placed in holes 8 in the lower horizontal crossbar 5 to prevent motion in the horizontal plane after pulling bars 1 are adjusted to the external diameter of the bearing 3.

Extending through the internally threaded bore 9 of the boss 8 of the rearward crossbar 4 is a threaded pulling bolt 10 having a head 11 at its rearward end and a hemispherical concave surface 12 at its forward end, which contacts the surface of a ball bearing 13.

The bottom seat of the ball bearing 13 is a socket 14 in a head member 15, which is firmly attached to the crossbar 5 and has a hard conical end 16, which is adapted to seat in the centering hole 16' of a bearing shaft 17.

Figure 3:
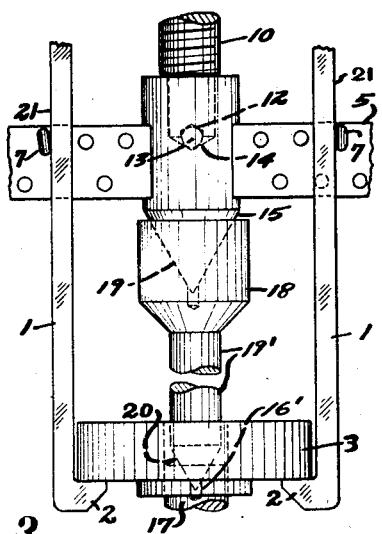
Figure 3 shows an extension member in use with the device, an upper portion of the puller not being shown.

Figure 3 indicates the necessarily different method of using this bearing puller when the bearing is close to the end of the shaft, through use of an extension bar 18.

The extension bar 18 has a recess 19 to receive the pointed end 16 of the head 15 at its upper end; a cylindrical portion 19 and a conical pointed end 20, which latter seats in the center of the bearing shaft 17.

The shaft 17 and bearing 3 are included in the drawing only to indicate the function of the invention, and are not parts of the invention.

In operation, the hook portions 2 are placed on the inner side of the bearing 3. Then the cotter pins 7 are placed in those holes 8 in the crossbar 5 that are closest to the outside surfaces 21 of the pulling bars 1. This prevents motion of pulling bars 1 in a lateral direction along crossbars 5 and 5.

The hexagonal head 11 of the screw 10 is rotated with a wrench until the point 16 is brought in contact with the center of the shaft 17.

The hexagonal head 11 is then further rotated, creating an inward force through the point 15 onto the shaft 17 and an outward force is transmitted through the threaded bore 9 of the boss 8 to the crossbar 4.

The crossbar 4 then transmits this outward force against the surface 22 of the puller bars 1, causing hook portions 2 of the puller bar 1 to exert an outward force on the bearing 3. Thus a double action is achieved, namely, a downward thrust is transmitted to the shaft and an upward lift given to the bearing simultaneously.

This device does not injure the shaft 17 as the rotary action of the pulling bolt 10 is absorbed not by the shaft 17 but by the ball 13.

From the foregoing description, it is thought to be obvious that a bearing puller constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A bearing puller comprising a pulling bolt having one end adapted to be rotated, the shank of said pulling bolt being threaded, the forward end of said bolt having a cylindrical portion having a smooth surface, the forward end of said cylindrical portion having a concave recess therein; a one-piece integral head member having a recess in its rearward end rotatably receiving said cylindrical portion of said pulling bolt, said head recess having a concave inner wall, said head portion having a conically shaped pointed forward end; said conical forward end having a rearward end portion of diameter substantially as great as the thickness of said head member for engaging the outer edges of centering holes in bearing shafts when such centering holes vary in diameter to a substantial degree; a forward cross bar attached to said head member, said forward cross bar having two portions extending outwardly on each side of said head member transversely thereof, said forward cross bar portions each having apertures extending downwardly therethrough, said apertures being spaced apart various distances from the inner ends respectively of each of said half cross bar portions; a bearing ball disposed between the forward end of said cylindrical portion of said pulling bolt and the inner end of said head member recess; a boss member having an internally threaded bore receiving said pulling bolt, said boss being disposed inwardly from the forward end of said pulling bolt; a rear cross bar having two half portions each attached to said boss at their inner ends and disposed extending outwardly from said head member transversely to said pulling bolt and on opposite sides of said boss; two pulling bars disposed one on each side of said pulling bolt, each pulling bar having an elongated main portion disposed in parallelism with said pulling bolt in use; said main portions each having an elongated longitudinal slot therein disposed in parallelism with said pulling bolt, each slot slidably receiving therethrough respectively one half portion of said forward and rearward cross bars, the forward ends of said pulling bars each having an end-turned hook portion for engaging an inner side of a bearing at a time when the pointed end of said head is disposed engaging a cylindrical hole in a shaft carrying said bearing whereby when said pulling bolt is rotated rearward the rearward crossbar will engage the rearward ends of the walls of said pulling bar slots; two securing members disposed one on the outer side of each of said pulling bars and disposed in each one of said apertures in said forward cross bar for engaging the outer side of said pulling bars to maintain them in a selected position during operation.

2. A bearing puller comprising a pulling bolt having one end adapted to be rotated, the shank of said pulling bolt being threaded, the forward end of said bolt having a cylindrical portion having a smooth surface, the forward end of said cylindrical portion having a concave recess therein; a one-piece integral head member having a recess in its rearward end rotatably receiving said cylindrical portion of said pulling bolt, said head recess having a concave inner wall, said head portion having a conically shaped pointed forward end; said conical forward end having a rearward end portion of diameter substantially as great as the thickness of said head member for engaging the outer edges of centering holes in bearing shafts when such centering holes vary in diameter to a substantial degree; a forward cross bar attached to said head member, said forward cross bar having two portions extending outwardly on each side of said head member transversely thereof, a bearing ball disposed between the forward end of said cylindrical portion of said pulling bolt and the inner end of said head member recess; a boss member having an internally threaded bore receiving said pulling bolt, said boss being disposed inwardly from the forward end of said pulling bolt; a rear cross bar having two half portions each attached to said boss at their inner ends and disposed extending outwardly from said head member transversely to said pulling bolt and on opposite sides of said boss; two pulling bars disposed one on each side of said pulling bolt, each pulling bar having an elongated main portion disposed in parallelism with said pulling bolt in use; said main portions each having an elongated longitudinal slot therein disposed in parallelism with said pulling bolt, each slot slidably receiving therethrough respectively one-half portion of said forward and rearward cross bars, the forward ends of said pulling bars each having an end-turned hook portion for engaging an inner side of a bearing at a time when the pointed end of said head is disposed engaging a cylindrical hole in a shaft carrying said bearing whereby when said pulling bolt is rotated rearward the rearward crossbar will engage the rearward ends of the walls of said pulling bar slots; and securing means attachable to said forward cross bar portions respectively and engaging the outer sides of said pulling bars to prevent said pulling bars from slipping off of the sides of said forward crossbar.

3. A bearing puller comprising a pulling bolt having one end adapted to be rotated, the shank of said pulling bolt being threaded, the forward end of said bolt having a cylindrical portion having a smooth surface, the forward end of said cylindrical portion having a concave recess therein; a head member having a recess in its rearward end rotatably receiving said cylindrical portion of said pulling bolt, said head recess having a concave inner wall, said head portion having a conically shaped pointed forward end; a forward cross bar attached to said head member, said forward cross bar having two portions extending outwardly on each side of said head member transversely thereof, a bearing ball disposed between the forward end of said cylindrical portion of said pulling bolt and the inner end of said head member recess; a boss member having an internally threaded bore receiving said pulling bolt, said boss being disposed inwardly from the forward end of said pulling bolt; a rear cross bar having two half portions each attached to said boss at their inner ends and disposed extending outwardly from said head member transversely to said pulling bolt and on opposite sides of said boss; two pulling bars disposed one on each side of said pulling bolt, each pulling bar having an elongated main portion disposed in parallelism with said pulling bolt in use; said main portion each having an elongated longitudinal slot therein disposed in parallelism with said pulling bolt, each slot slidably receiving therethrough respectively one half portion of said forward and rearward cross bars, the forward ends of said pulling bars having an end-turned hook portion for engaging an inner side of a bearing at a time when the pointed end of said head is disposed engaging a cylindrical hole in a shaft carrying said bearing whereby when said pulling bolt is rotated rearward the rearward cross bar will engage the rearward ends of the walls of said pulling bar slots; and securing means attachable to said forward cross bar portions respectively and engaging the outer sides of said pulling bars to prevent said pulling bars from slipping off of the sides of said forward cross bar.

4. A bearing puller comprising a pulling bolt having one end adapted to be rotated, the shank of said pulling bolt being threaded, the forward end of said bolt having a cylindrical portion having a smooth surface, a head member disposed forwardly of said pulling bolt, said head member having conical means on its forward end for engaging centering hole, means rotatably attaching the forward end of said pulling bolt to the rearward end of said head member; a forward cross bar attached to said head member, said forward cross bar having two portions extending outwardly on each side of said head member transversely thereof, a bearing ball disposed between the forward end of said cylindrical portion of said pulling bolt and the inner end of said head member recess; a boss member having an internally threaded bore receiving said pulling bolt, said boss being disposed inwardly from the forward end of said pulling bolt; a rear cross bar having two half portions each attached to said boss at their inner ends and disposed extending outwardly from said head member transversely to said pulling bolt and on opposite sides of said boss; two pulling bars disposed one on each side of said pulling bolt, each pulling bar having an elongated main portion disposed in parallelism with said pulling bolt in use; said main portions each having an elongated longitudinal slot therein disposed in parallelism with said pulling bolt, each slot slidably receiving therethrough respectively one half portion of said forward and rearward cross bars, the forward ends of said pulling bars each having an end-turned hook portion for engaging an inner side of a bearing at a time when the pointed end of said head is disposed engaging a cylindrical hole in a shaft carrying said bearing whereby when said pulling bolt is rotated rearward the rearward cross bar will engage the rearward ends of the walls of said pulling bar slots; and securing means attachable to said forward cross bar portions respectively and engaging the outer sides of said pulling bars to prevent said pulling bars from slipping off of the sides of said forward cross bar.

References Cited in the file of this patent

UNITED STATES PATENTS

| | | |
|---|---|---|
| 1,345,186 | Holland | June 29, 1920 |
| 1,485,733 | Sterling et al. | Mar. 4, 1924 |
| 1,584,855 | Eisenhuth | May 18, 1926 |
| 1,964,470 | King | June 26, 1934 |
| 2,360,781 | McGinnis et al. | Oct. 17, 1944 |
| 2,385,000 | Hoke | Sept. 18, 1945 |
| 2,551,900 | Pihl | May 8, 1951 |

FOREIGN PATENTS

| | | |
|---|---|---|
| 120,557 | Australia | Nov. 5, 1945 |